Patented May 10, 1932

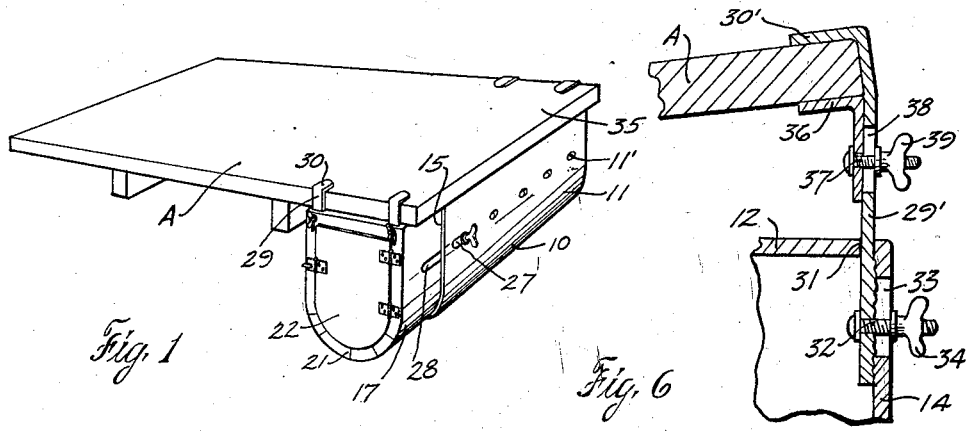
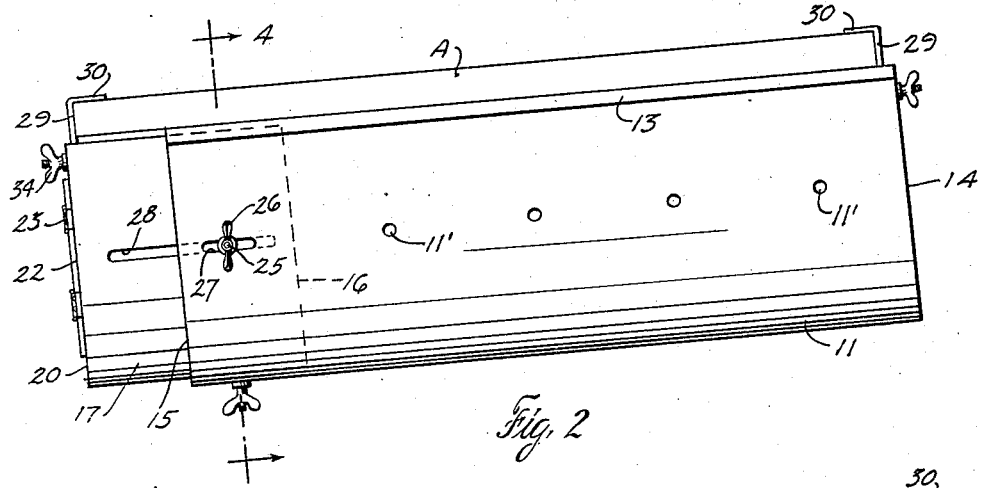
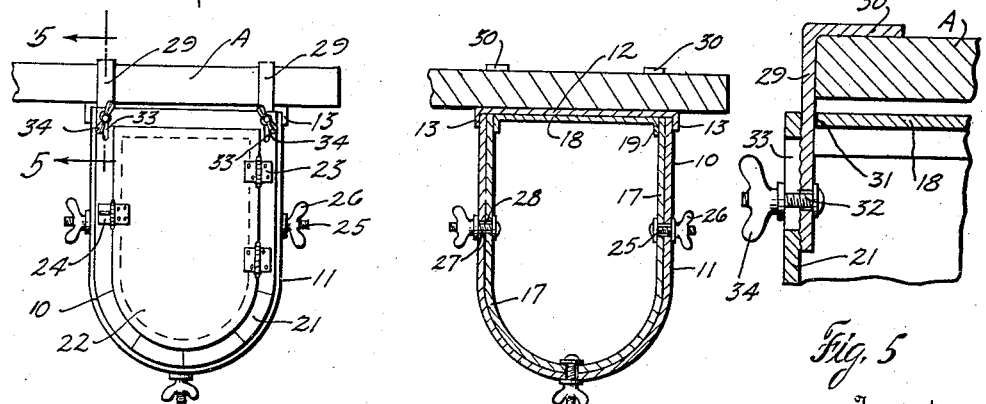

1,857,522

UNITED STATES PATENT OFFICE

ERNEST W. UNGEHEUER, OF DALLAS, TEXAS

CONTAINER FOR TABLES

Application filed March 16, 1931. Serial No. 522,901.

This invention relates to new and useful improvements in drawing material containers for drafting tables and the like.

The main object of the invention is to provide a convenient, safe, and individual container for drawing sheets, sketches, prints, and the like, with which a draftsman may be working.

Another object of the invention is to provide an adjustable container having adjustable supporting means, whereby said container may be varied as to length to conform to drafting tables of various widths and may be conveniently attached to tables of various thicknesses without marring or injuring said tables.

A further object of the invention is to provide a container or receptacle so constructed and adapted as to be attached beneath the wing of a drafting table in position for convenient access to said container and yet out of the way of a draftsman working on said table.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a perspective view showing a device constructed in accordance with the invention and to a drafting table, Figure 2 is a side elevation of the container, Figure 3 is an end elevation of the same, Figure 4 is a transverse vertical sectional view taken on the line 4—4 of Figure 2, Figure 5 is a vertical sectional view of the supporting means taken on the line 5—5 of Figure 3, and Figure 6 is a detailed sectional view of an alternate form of supporting means.

In the drawings the numeral 10 designates a receptacle or container of sheet metal or the like comprising a casing 11 of U-shape in cross section and having a flat top 12 suitably secured thereto as by welding. The top is provided with flanges 13 turned downwardly on the outside of the casing, which flanges serve to brace said casing intermediate its ends (Figures 2 and 4). One end 14 of the casing is closed while the other end 15 is open for the telescoping therein of the open end 16 of a reduced casing 17, similar to the casing 11. The reduced casing 17 has a top 18 secured thereto with down turned flanges 19 on the inside of said casing to provide a close sliding fit of the latter in the casing 11.

The other end 20 of the casing 17 is provided with an inturned flange 21 to which a swinging door 22 is mounted by hinges 23. A suitable hasp 24 is provided on the door for convenience in locking the same when desired. The flange 21 serves as a stop to prevent the rolled drawings and such which are contained in the receptacle from sliding out through the door 22 when the drafting table and likewise the receptacle, are positioned at an inclination, as is shown in Figure 2. Suitable vent holes 11' are provided in the casing 11 to admit fresh air within the receptacle.

Adjusting bolts 25 and wing nuts 26 extend through slots 27 and 28 respectively in the casings 16 and 11 to provide for convenient adjustment of the container to various lengths. Hangers 29, formed of strap iron or the like, with ends bent at right angles thereto to form feet 30, are provided at opposite ends of the container and extend through slots 31 (Figure 5) in the tops 12 and 18. These hangers are adjustably secured to casings by bolts 32 which are carried by the hangers and extend through slots 33 in the flange 21 and the end 14 and receive wing nuts 34. The contacting surfaces of the hangers and the casings may be grooved or corrugated to provide a secure gripping surface.

By reason of the adjustable hangers 29 and the adjustable length of the container, said container may be easily and conveniently secured to drafting tables of different thicknesses and widths. In using this container with a drafting table A, such as illustrated in Figure 1, it is desirable to secure the container beneath one of the wings 35 of said table out of the way of the draftsman who may be working on the table. The container, as illustrated, is of sufficient size and length to receive rolled prints, drawings and the like of the sizes most commonly used, but said receptacle may be made in various sizes for special uses.

In Figure 6 an alternate form of hanger is illustrated which consists of an elongated strap 29' having a fixed foot 30' and an adjustable foot 36. The foot 36 is secured to the strap by a bolt 37 which extends through a slot 38 in said strap and receives a wing nut 39. The lower end of the strap extends through the slot 31 and is adjustably secured by the bolt 32 and wing nut 34. This hanger may be substituted for the hanger 29 at the near end of the container when it is desired to decrease the angle of inclination at which said container would otherwise be mounted. As shown in Figure 6 the feet 30' and 36 form a clamp and may be bent parallel to the surface of the table, whereby said clamp may firmly grip the edge of the table without marring the same.

It is obvious that with the use of this device the draftsman is provided with a convenient, safe and individual container for holding drawings and prints with or on which he is working or referring to.

Various changes in the size and shape of the different parts, as well as modifications and alterations, may be made within the scope of the appended claims.

Having illustrated and described preferred forms of the invention, what I claim, is:

1. In a container for tables, an elongated container including adjustable sections, whereby said container may be varied as to length, and adjustable attaching means for securing said container to the edges of a table, said attaching means being detachable.

2. In a container for tables, an enclosed sheet metal container including telescoping sections, adjusting means for securing said sections in various telescopic positions, one of the telescoping sections having an open end, an inturned flange surrounding said open end, and means for detachably securing said container to a table.

3. A container for tables as set forth in claim 2, with a door for closing the open end of one of said sections, and means for adjusting the securing means to conform to tables of various thicknesses.

4. In a container for tables, an elongated metal container including an outer casing and a reduced inner casing telescoping in said outer casing, means for adjustably securing said casings, a door in one of the casings, and adjustable hangers at opposite ends of the container for suspending said container below a table.

5. A container for tables as set forth in claim 4, with the container having air vent openings therein, and said hangers being detachable.

In testimony whereof I affix my signature.

ERNEST W. UNGEHEUER.